United States Patent
Welch

(10) Patent No.: US 9,545,355 B1
(45) Date of Patent: Jan. 17, 2017

(54) ATTACHMENT APPARATUS FOR A CRUTCH

(71) Applicant: Donald Keith Welch, New Braunfels, TX (US)

(72) Inventor: Donald Keith Welch, New Braunfels, TX (US)

( * ) Notice: Subject to any disclaimer, the term of this patent is extended or adjusted under 35 U.S.C. 154(b) by 0 days.

(21) Appl. No.: 14/921,565

(22) Filed: Oct. 23, 2015

(51) Int. Cl.
| | |
|---|---|
| A45B 3/00 | (2006.01) |
| H04M 1/00 | (2006.01) |
| A61H 3/02 | (2006.01) |
| A47G 23/02 | (2006.01) |
| A45C 11/00 | (2006.01) |
| H04B 1/3888 | (2015.01) |

(52) U.S. Cl.
CPC ............... *A61H 3/02* (2013.01); *A45C 11/00* (2013.01); *A47G 23/0225* (2013.01); *H04B 1/3888* (2013.01); *A45C 2011/002* (2013.01)

(58) Field of Classification Search
CPC ... A61H 1/0262; A61H 3/00; A61H 2201/163
USPC ................. 135/68, 66, 69; 224/407
See application file for complete search history.

(56) References Cited

U.S. PATENT DOCUMENTS

| | | | | |
|---|---|---|---|---|
| 5,526,836 A | * | 6/1996 | Sigsworth ............... | A45B 1/00 135/66 |
| 5,642,749 A | * | 7/1997 | Perryman ............... | A61H 3/02 135/66 |
| 5,647,519 A | | 7/1997 | Brennan | |
| 5,803,327 A | | 9/1998 | Nipper et al. | |
| 6,026,833 A | * | 2/2000 | Conte ............... | A61H 3/02 135/66 |
| 8,146,614 B2 | | 4/2012 | Ford et al. | |
| 2002/0056736 A1 | * | 5/2002 | Conte ............... | A61H 3/02 224/407 |
| 2006/0137728 A1 | * | 6/2006 | Floriani ............... | A61H 3/02 135/66 |

* cited by examiner

*Primary Examiner* — Kiet Doan
(74) *Attorney, Agent, or Firm* — Stevenson IP, LLC

(57) ABSTRACT

An attachment apparatus for a crutch including a pair of horizontal supports, a rectangular attachment having a back side and a front side, and a pair of clips. The pair of horizontal supports includes an upper support and a lower support. A right end of each of the upper support and the lower support, and a left end of each of the upper support and the lower support are attached to a right side support of a crutch and a left side support of a crutch, respectively. The pair of clips includes an upper clip and a lower clip. Each of the upper clip and the lower clip has a female receptor and a male member. Each of the female receptors is disposed on each of the pair of horizontal supports, and each of the male members is disposed on the back side of the attachment.

4 Claims, 3 Drawing Sheets

ATTACHMENT APPARATUS FOR A CRUTCH

BACKGROUND OF THE INVENTION

Various types of crutch attachments are known in the prior art. However, what has been needed is an attachment apparatus for a crutch including a pair of horizontal supports, a rectangular attachment having a back side and a front side, and a pair of clips. The pair of horizontal supports includes an upper support and a lower support. A right end of each of the upper support and the lower support, and a left end of each of the upper support and the lower support are attached to a right side support of a crutch and a left side support of a crutch, respectively. What has been further needed is for the pair of clips to include an upper clip and a lower clip. A female receptor of each of the upper clip and the lower clip is medially disposed on a front surface of each of the upper support and the lower support, and a male member of each of the upper clip and the lower clip is medially disposed on the back side of the attachment. Lastly, what has been needed is for each of the male members to removably engage each of the female receptors so that the attachment is removably attachable to a crutch. The attachment apparatus for a crutch provides a user of the crutch with versatility to modify the optional types of attachments that can be removably attached to the crutch including, but not limited to, a cup holder and a cellular phone holder. The apparatus thus provides the user with the ability to easily carry and store various accessories using the attachment on the crutch.

FIELD OF THE INVENTION

The present invention relates to crutch attachments, and more particularly, to an attachment apparatus for a crutch.

SUMMARY OF THE INVENTION

The general purpose of the present attachment apparatus for a crutch, described subsequently in greater detail, is to provide a crutch attachment which has many novel features that result in an attachment apparatus for a crutch which is not anticipated, rendered obvious, suggested, or even implied by prior art, either alone or in combination thereof.

To accomplish this, the present attachment apparatus for a crutch includes a pair of horizontal supports, a rectangular attachment having a back side and a front side, and a pair of clips. The pair of horizontal supports includes an upper support and a lower support. Each of the upper support and the lower support has a right end, a left end, and a front surface. The right end of each of the upper support and the lower support, and the left end of each of the upper support and the lower support are attached to a right side support of a crutch and a left side support of a crutch, respectively. The upper support is disposed parallel to the lower support.

The pair of clips includes an upper clip and a lower clip. Each of the upper clip and the lower clip has a female receptor and a male member. The female receptor of each of the upper clip and the lower clip is medially disposed on the front surface of each of the upper support and the lower support, respectively. The male member of each of the upper clip and the lower clip is medially disposed on the back side of the attachment. The female receptor of the upper clip is colinearly disposed with the female receptor of the lower clip, and the male member of the upper clip is colinearly disposed with the male member of the lower clip. The male member of each of the upper clip and the lower clip simultaneously removably engages the female receptor of each of the upper clip and the lower clip, respectively. The pair of clips is optionally plastic.

The attachment optionally further includes a cup holder disposed on the front side of the attachment. The cup holder optionally includes a plurality of rubberized gripping members. The plurality of gripping members is continuously disposed around an opening of the cup holder proximal a top side of the cup holder. The plurality of gripping members is configured to slidably engage an exterior surface of a cup in order to removably secure the cup within the cup holder.

The attachment can also optionally include an aperture disposed through a top surface of the attachment to proximal a bottom surface of the attachment. A width of the attachment aperture and a length of the attachment aperture substantially conforms to a width of a cellular phone and a length of the cellular phone, respectively.

Thus has been broadly outlined the more important features of the present attachment apparatus for a crutch so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
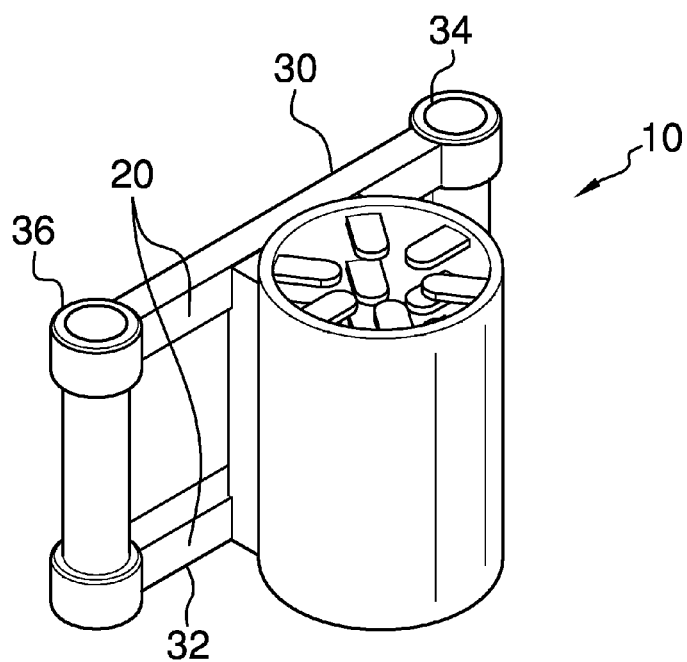
FIG. 1 is a front isometric view showing a cup holder.
Figure 2:
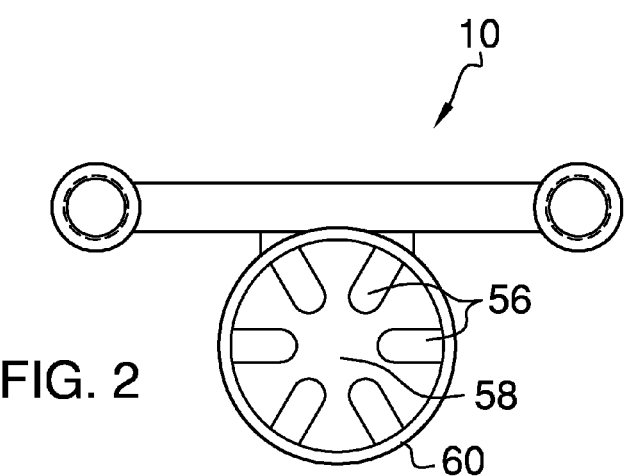
FIG. 2 is a top plan view.
Figure 3:
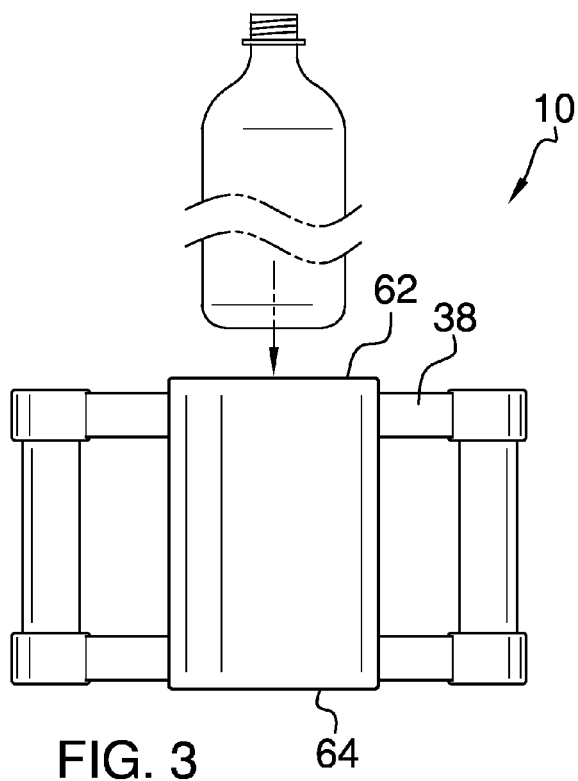
FIG. 3 is a front elevation view.
Figure 4:
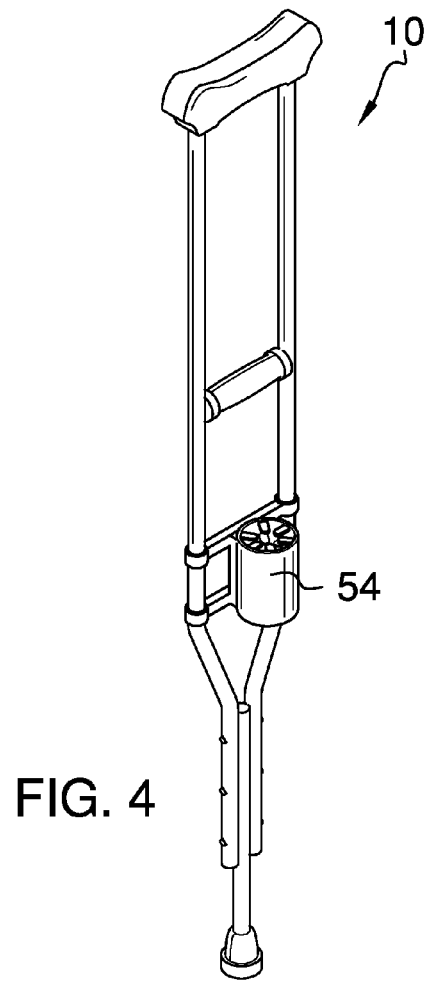
FIG. 4 is an in-use view showing the cup holder.
Figure 5:
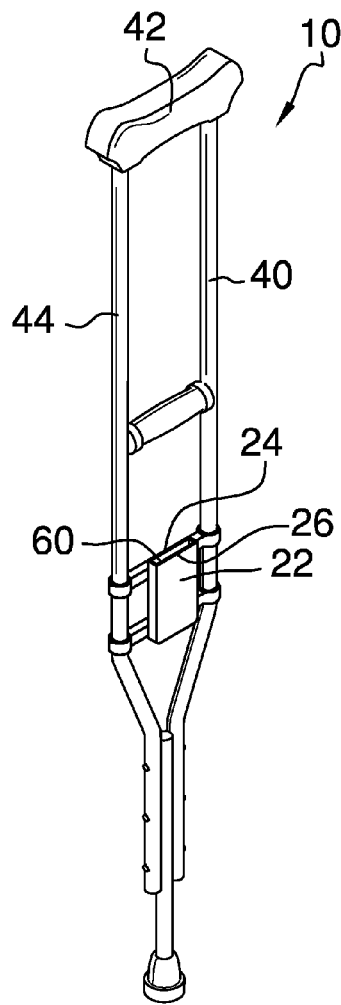
FIG. 5 is a front isometric view showing an opening within an attachment.
Figure 6:
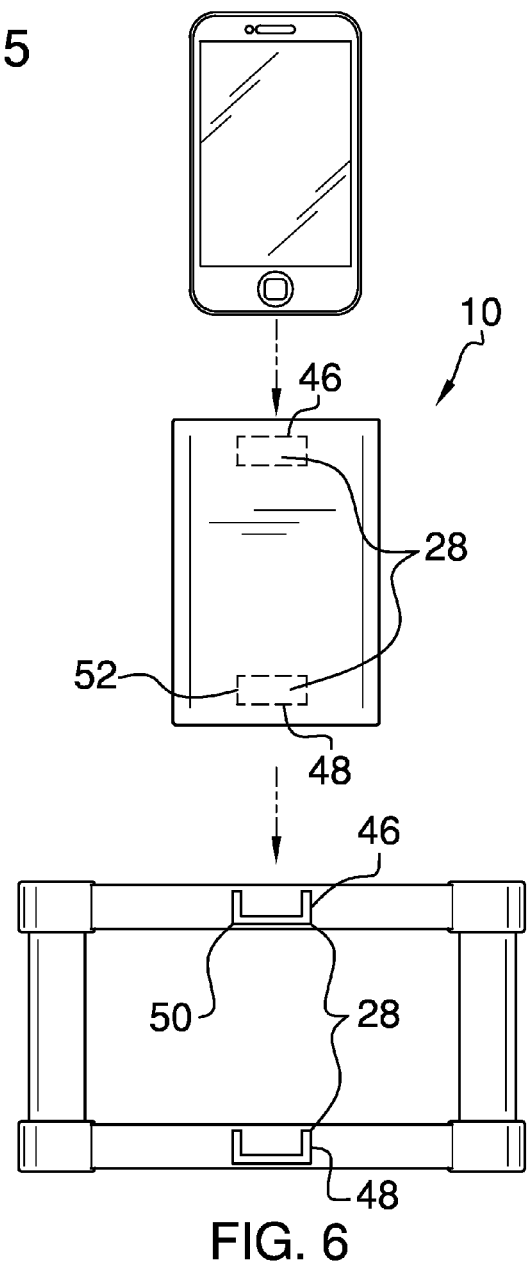
FIG. 6 is an in-use view showing a cellular phone removably disposed within the opening.

With reference now to the drawings, and in particular FIGS. 1 through 6 thereof, an example of the instant attachment apparatus for a crutch employing the principles and concepts of the present attachment apparatus for a crutch and generally designated by the reference number 10 will be described.

Referring to FIGS. 1 through 6 the present attachment apparatus for a crutch 10 is illustrated. The attachment apparatus for a crutch 10 includes a pair of horizontal supports 20, a rectangular attachment 22 having a back side 24 and a front side 26, and a pair of clips 28. The pair of horizontal supports 20 includes an upper support 30 and a lower support 32. Each of the upper support 30 and the lower support 32 has a right end 34, a left end 36, and a front surface 38. The right end 34 of each of the upper support 30 and the lower support 32, and the left end 36 of each of the upper support 30 and the lower support 32 are attached to a right side support 40 of a crutch 42 and a left side support 44 of a crutch 42, respectively. The upper support 30 is disposed parallel to the lower support 32.

The pair of clips 28 includes an upper clip 46 and a lower clip 48. Each of the upper clip 46 and the lower clip 48 has a female receptor 50 and a male member 52. The female receptor 50 of each of the upper clip 46 and the lower clip 48 is medially disposed on the front surface 38 of each of the upper support 30 and the lower support 32, respectively. The male member 52 of each of the upper clip 46 and the lower clip 48 is medially disposed on the back side 24 of the attachment 22. The female receptor 50 of the upper clip 46 is colinearly disposed with the female receptor 50 of the lower clip 48, and the male member 52 of the upper clip 46 is colinearly disposed with the male member 52 of the lower clip 48. The male member 52 of each of the upper clip 46 and the lower clip 48 simultaneously removably engages the female receptor 50 of each of the upper clip 46 and the lower clip 48, respectively.

The attachment 22 optionally further includes a cup holder 54 disposed on the front side 26 of the attachment 22. The cup holder 54 optionally includes a plurality of rubberized gripping members 56. The plurality of gripping members 56 is continuously disposed around an opening 58 of the cup holder 54 proximal a top side 60 of the cup holder 54.

The attachment 22 can also optionally include an aperture 60 disposed through a top surface 62 of the attachment 22 to proximal a bottom surface 64 of the attachment 22.

What is claimed is:

1. An attachment apparatus for a crutch comprising:
   a pair of horizontal supports comprising an upper support and a lower support, each of the upper support and the lower support having a right end, a left end, and a front surface, wherein the right end of each of the upper support and the lower support and the left end of each of the upper support and the lower support are attached to a right side support of a crutch and a left side support of the crutch, respectively;
   wherein the upper support is disposed parallel to the lower support;
   a rectangular attachment having a back side and a front side;
   a pair of clips comprising an upper clip and a lower clip, each of the upper clip and the lower clip having a female receptor and a male member, wherein the female receptor of each of the upper clip and the lower clip is medially disposed on the front surface of each of the upper support and the lower support, respectively, and the male member of each of the upper clip and the lower clip is medially disposed on the back side of the attachment;
   wherein the female receptor of the upper clip is colinearly disposed with the female receptor of the lower clip;
   wherein the male member of the upper clip is colinearly disposed with the male member of the lower clip;
   wherein the male member of each of the upper clip and the lower clip simultaneously removably engages the female receptor of each of the upper clip and the lower clip, respectively;
   wherein the attachment further comprises an aperture disposed through a to surface of the attachment to proximal a bottom surface of the attachment, wherein a width of the attachment aperture and a length of the attachment aperture substantially conforms to a width of a cellular phone and a length of the cellular phone, respectively;
   wherein the pair of clips is plastic.

2. The attachment apparatus for a crutch of claim 1 wherein the attachment further comprises a cup holder disposed on the front side of the attachment.

3. The attachment apparatus for a crutch of claim 2 wherein the cup holder further comprises a plurality of rubberized gripping members continuously disposed around an opening of the cup holder proximal a top side of the cup holder, wherein the plurality of gripping members is configured to slidably engage an exterior surface of a cup in order to removably secure the cup within the cup holder.

4. The attachment apparatus for a crutch of claim 2 wherein the pair of clips is plastic.

* * * * *